(12) United States Patent
Yamaguchi et al.

(10) Patent No.: US 11,819,092 B2
(45) Date of Patent: Nov. 21, 2023

(54) BUCKLE DEVICE

(71) Applicants: KABUSHIKI KAISHA TOKAI-RIKA-DENKI-SEISAKUSHO, Aichi (JP); Toyota Jidosha Kabushiki Kaisha, Aichi-ken (JP)

(72) Inventors: Ryuji Yamaguchi, Aichi-ken (JP); Yoshio Mizuno, Aichi-ken (JP); Yutaka Hirako, Aichi-ken (JP)

(73) Assignees: KABUSHIKI KAISHA TOKAI-RIKA-DENKI-SEISAKUSHO, Aichi-Ken (JP); TOYOTA JIDOSHA KABUSHIKI KAISHA

(*) Notice: Subject to any disclaimer, the term of this patent is extended or adjusted under 35 U.S.C. 154(b) by 0 days.

(21) Appl. No.: 17/886,390

(22) Filed: Aug. 11, 2022

(65) Prior Publication Data

US 2023/0067413 A1    Mar. 2, 2023

(30) Foreign Application Priority Data

Aug. 26, 2021 (JP) .................................. 2021-138398

(51) Int. Cl.
*A44B 11/00* (2006.01)
*B60R 22/185* (2006.01)
*B60R 22/26* (2006.01)

(52) U.S. Cl.
CPC .......... *A44B 11/006* (2013.01); *B60R 22/185* (2013.01); *B60R 22/26* (2013.01)

(58) Field of Classification Search
CPC .............. B60R 22/28; B60R 2022/281; B60R 2022/287; B60R 2022/286; A44B 11/006; A44B 11/2569
See application file for complete search history.

(56) References Cited

U.S. PATENT DOCUMENTS

| 10,286,872 | B2* | 5/2019 | Faruque ................. B60R 22/22 |
| 11,135,997 | B2* | 10/2021 | Shimazu ................ B60R 22/28 |
| 2019/0071053 | A1 | 3/2019 | Imanaka et al. |
| 2020/0247352 | A1 | 8/2020 | Shimazu et al. |

FOREIGN PATENT DOCUMENTS

| JP | 2019-043435 A1 | 3/2019 |
| JP | 2020-125010 A1 | 8/2020 |

* cited by examiner

*Primary Examiner* — Robert Sandy
(74) *Attorney, Agent, or Firm* — Thomas W. Cole; Calderon Safran & Cole P.C.

(57) ABSTRACT

In a buckle device, when a belt starts to be allowed to be drawn, a fracture portion is deformed by a side surface of a connection hole of a spool, so that the fracture portion allows a rotation of the spool and allows drawing of the belt. Then, the fracture portion is fractured by the side surface of the connection hole. Therefore, a drawing allowance load of the belt when the belt starts to be allowed to be drawn can be increased.

10 Claims, 10 Drawing Sheets

BUCKLE DEVICE

CROSS-REFERENCE TO RELATED APPLICATION

This application is based on and claims priority under 35 USC 119 from Japanese Patent Application No. 2021-138398 filed on Aug. 26, 2021, the disclosure of which is incorporated by reference herein.

BACKGROUND

Technical Field

The present invention relates to a buckle device in which a buckle body and a winding shaft are connected via a connection member.

Related Art

In the buckle device described in Japanese Patent Application Laid-Open (JP-A) No. 2020-125010, the leading end side of a webbing is connected to the buckle body, the webbing is wound around a spool from the base end side, and a torsion shaft is connected to the spool to prevent the webbing from being drawn from the spool. Further, the torsion shaft is deformed to allow the webbing to be drawn from the spool, thereby allowing the buckle body to extend.

Here, in such a buckle device, it is preferable that the drawing allowance load of the webbing when the webbing starts to be allowed to be drawn from the spool can be increased.

SUMMARY

In view of the above fact, an object of the invention is to obtain a buckle device capable of increasing a drawing allowance load of a connection member when the connection member starts to be allowed to be drawn from a winding shaft.

A buckle device according to a first aspect of the invention includes: a buckle body with which a tongue provided at a webbing attached to an occupant is engaged; a connection member which has a leading end side connected to the buckle body; a winding shaft around which the connection member is wound from a base end side; a prevention member which is configured to prevent the connection member from being drawn from the winding shaft, and which is deformed to allow the connection member to be drawn from the winding shaft and allow the buckle body to extend; and a fracture portion which is configured to prevent the connection member from being drawn from the winding shaft, which is deformed to allow the connection member to be drawn from the winding shaft when the connection member starts to be allowed to be drawn from the winding shaft, and which is fractured to permit the connection member to be drawn from the winding shaft.

In the buckle device of the first aspect of the invention, the tongue provided at the webbing attached to the occupant is engaged with the buckle body. In addition, the leading end side of the connection member is connected to the buckle body, the connection member is wound around the winding shaft from the base end side, and the prevention member is configured to prevent the connection member from being drawn from the winding shaft. Further, the prevention member is deformed to allow the connection member to be drawn from the winding shaft, thereby allowing the buckle body to extend.

Here, the fracture portion is configured to prevent the connection member from being drawn from the winding shaft, and when the connection member starts to be allowed to be drawn from the winding shaft, the fracture portion is deformed to allow the connection member to be drawn from the winding shaft. Then, the fracture portion is fractured to permit the connection member to be drawn from the winding shaft. Therefore, the drawing allowance load of the connection member when the connection member starts to be allowed to be drawn from the winding shaft can be increased by the deformation load of the fracture portion.

In a buckle device according to a second aspect of the invention, the buckle device according to the first aspect of the invention further includes a restriction member at which rotation is restricted, and which is provided with the fracture portion.

In the buckle device of the second aspect of the invention, the rotation of the restriction member is restricted, and the fracture portion is provided at the restriction member. Therefore, the fracture portion can be easily installed.

In a buckle device according to a third aspect of the invention, the buckle device according to the first aspect or the second aspect of the invention further includes a locking body at which the prevention member is locked, and which is provided with the fracture portion.

In the buckle device of the third aspect of the invention, the prevention member is locked at the locking body. Here, the fracture portion is provided at the locking body. Therefore, the number of components can be reduced.

In a buckle device according to a fourth aspect of the invention, the buckle device according to any one of the first to third aspects of the invention further includes a support which supports the winding shaft, and which is provided with the fracture portion.

In the buckle device of the fourth aspect of the invention, the support supports the winding shaft. Here, the fracture portion is provided at the support. Therefore, the number of components can be reduced.

BRIEF DESCRIPTION OF THE DRAWINGS

Exemplary embodiments of the present invention will be described in detail based on the following figures, wherein.

DETAILED DESCRIPTION OF THE INVENTION

First Embodiment

Figure 1:
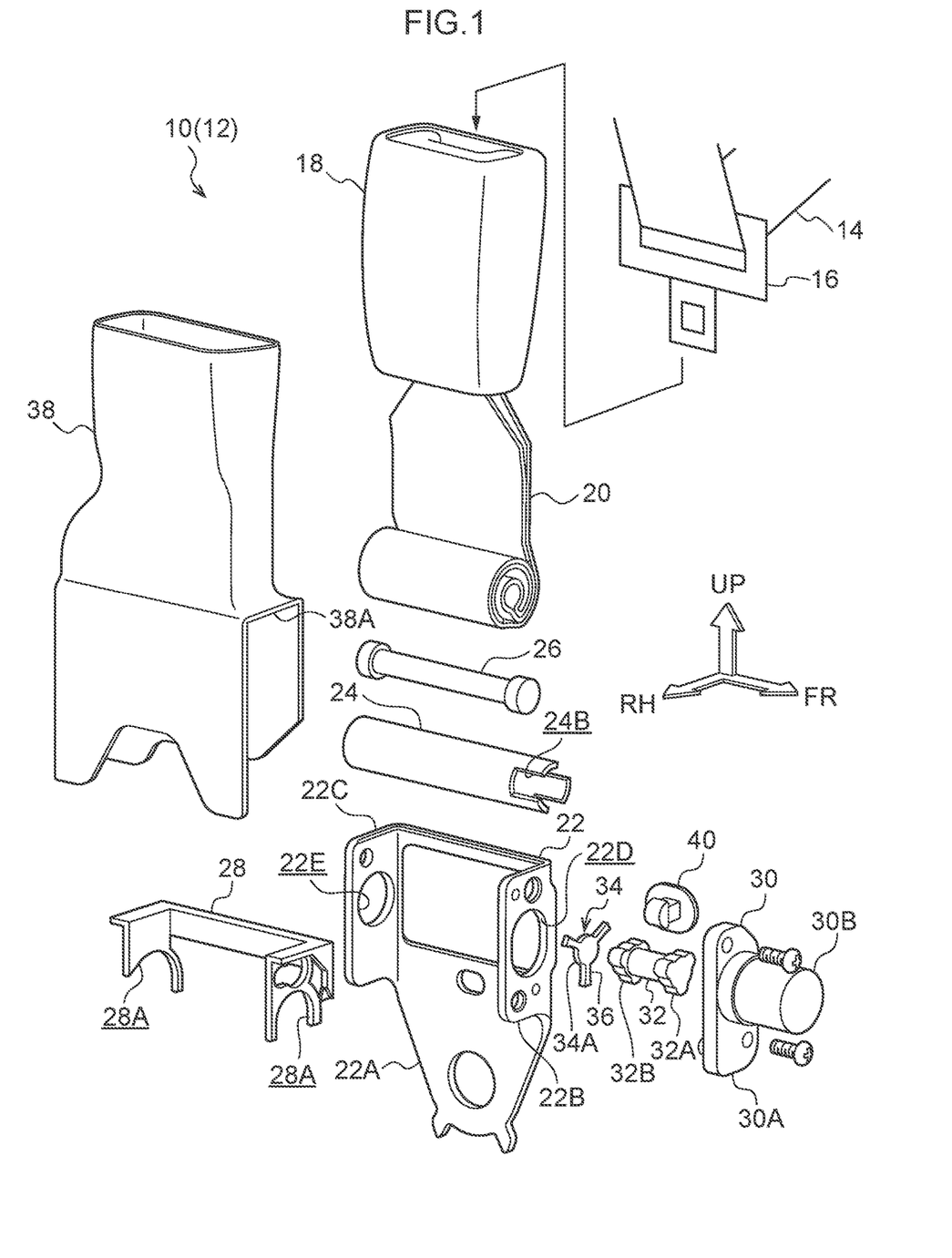
FIG. 1 is an exploded perspective view illustrating a buckle device according to a first embodiment of the invention as viewed from an obliquely front right side.
Figure 2A:
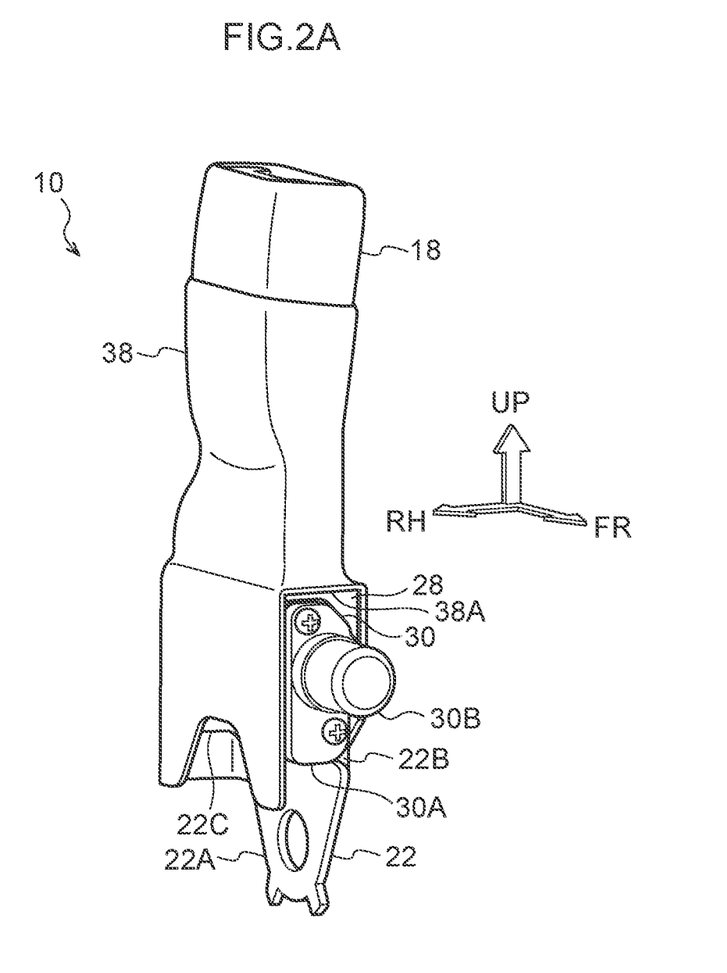
FIG. 2A is a perspective view illustrating the entire buckle device according to the first embodiment of the invention as viewed from the obliquely front right side.
Figure 2B:
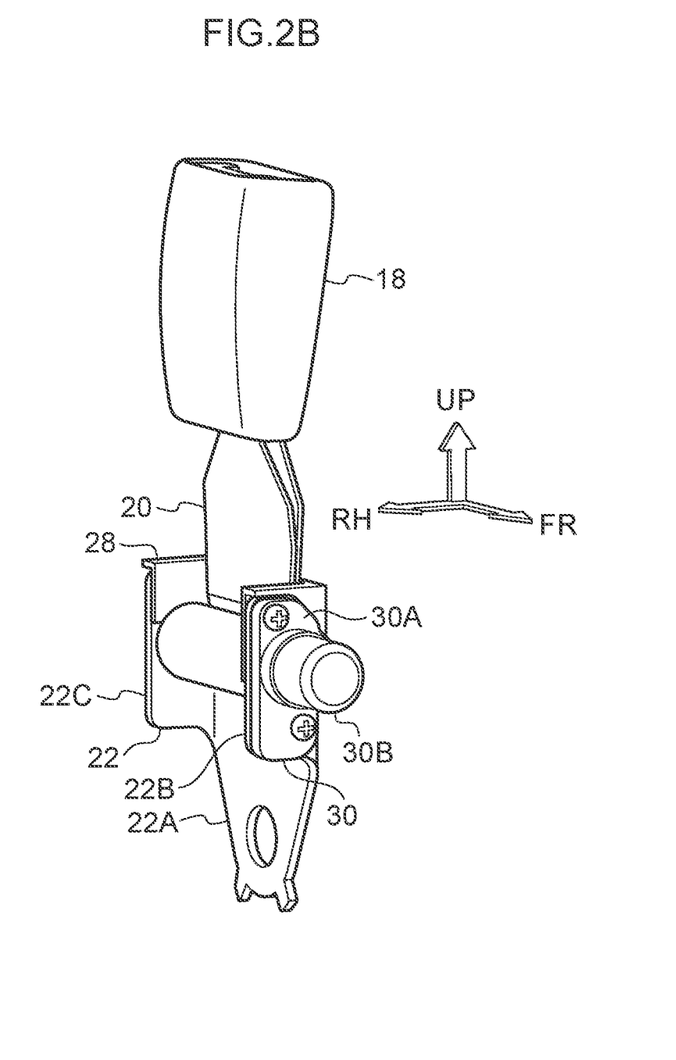
FIG. 2B is a perspective view illustrating the inside of the buckle device according to the first embodiment of the invention as viewed from the obliquely front right side.

FIG. 1 is an exploded perspective view of a buckle device 10 according to a first embodiment of the invention as viewed from an obliquely front right side. Further, FIG. 2A illustrates the buckle device 10 in a perspective view as viewed from the obliquely front right side, and FIG. 2B illustrates the inside of the buckle device 10 in a perspective view as viewed from the obliquely front right side. Note that in the drawings, the front side of the buckle device 10 is indicated by an arrow FR, the right side (face side) of the buckle device 10 is indicated by an arrow RH, and the upper side of the buckle device 10 is indicated by an arrow UP.

The buckle device 10 according to this embodiment configures a seat belt device 12 of a vehicle (automobile), and the seat belt device 12 is applied to a seat (not illustrated) in a vehicle interior. The seat belt device 12 is provided with a winding device (not illustrated), and the winding device is installed on the vehicle width direction outer side and the lower side of the seat rear portion. In the winding device, a long belt-shaped webbing 14 (see FIG. 1) is wound from a base end side, and the webbing 14 is urged to a winding side to the winding device and drawn upward from the winding device. The winding device is provided with a lock mechanism, and the lock mechanism locks the drawing of the webbing 14 from the winding device in an emergency (at the time of collision or the like) of the vehicle.

The webbing 14 movably passes through a through anchor (not illustrated) on a leading end side with respect to the winding device, and the through anchor is installed on the vehicle width direction outer side and the upper side of the seat rear portion. An anchor (not illustrated) is fixed to the leading end portion of the webbing 14, and the anchor is installed on the vehicle width direction outer side and the lower side of the seat rear portion. The webbing 14 movably passes through a tongue 16 (see FIG. 1) between the through anchor and the anchor.

The buckle device 10 is installed on the vehicle width direction inner side and the lower side of the seat rear portion, and the front, right, and upper sides of the buckle device 10 are directed to the front side or rear side of the vehicle, the vehicle width direction inner side and the upper side of the vehicle, respectively.

As illustrated in FIGS. 1, 2A, and 2B, a buckle body 18 having a substantially rectangular parallelepiped shape is provided on the upper portion of the buckle device 10. The tongue 16 is engageable with the buckle body 18 from the upper side, the tongue 16 is engaged with the buckle body 18, and the webbing 14 is attached to an occupant seated on the seat. As a result, a portion (shoulder webbing) of the webbing 14 between the through anchor and the tongue 16 is stretched in an oblique direction from the shoulder portion to the waist portion (including the chest portion) of the occupant, and a portion (wrap webbing) of the webbing 14 between the tongue 16 and the anchor is stretched in a lateral direction to the waist portion of the occupant. The engagement of the tongue 16 with the buckle body 18 is releasable, and the engagement of the tongue 16 with the buckle body 18 is released to release the attachment of the webbing 14 to the occupant. In addition, the lower portion of the buckle body 18 is gradually reduced toward the lower side in a right-left direction.

The leading end side portion (upper portion) of a belt-shaped belt 20 (webbing) as a connection member is connected to the lower portion of the buckle body 18, and the belt 20 is made of the same material as the webbing 14, for example. The base end portion (lower end portion) of the belt 20 is folded back and sewn at the vicinity of the base end portion of the belt 20, whereby the base end side portion (lower side portion) of the belt 20 is formed in an annular shape.

A frame 22, which is made of metal, as a support is provided in the lower portion of the buckle device 10, and the cross section of the frame 22 is formed in a U-shaped plate shape. A back plate 22A is provided on the left portion of the frame 22, and in the frame 22, the lower end portion of the back plate 22A is fixed to a vehicle body side (for example, the rear portion of a seat lower portion). A leg plate 22B and a leg plate 22C are provided at the front portion and the rear portion of the frame 22, respectively, and the leg plate 22B and the leg plate 22C protrude rightward from the back plate 22A. A substantially circular support hole 22D and a circular support hole 22E are formed to penetrate the leg plate 22B and the leg plate 22C, respectively, and the support hole 22D and the support hole 22E face each other in a front-rear direction.

A spool 24, which is made of metal and has a substantially cylindrical shape, as a winding shaft passes through the support hole 22D and the support hole 22E of the frame 22, and the spool 24 is supported by the frame 22. The axial direction of the spool 24 is parallel to the front-rear direction, and the spool 24 is rotatable about a central axis. An insertion hole 24A (see FIG. 8) having an elongated rectangular shape is formed to penetrate a portion of the spool 24 except for a front portion, and the insertion hole 24A extends in the axial direction of the spool 24 and is opened to the rear side. In the front portion of the spool 24, a plurality of (three in this embodiment) rectangular connection holes 24B as connected portions are formed to penetrate the front portion, and the plurality of connection holes 24B are disposed at equal intervals in the circumferential direction of the spool 24 and opened to the front side. The circumferential dimension of the spool 24 of the connection hole 24B is larger than the circumferential dimension of the spool 24 (widthwise dimension) of the insertion hole 24A, and the insertion hole 24A communicates with one connection hole 24B.

A bar 26, which is made of metal and has a substantially columnar shape, as a locking member is coaxially inserted into the spool 24, and both axial end portions of the bar 26 are coaxially enlarged in diameter and fitted into the spool 24. The base end side portion (annular portion) of the belt 20 is inserted into the insertion hole 24A of the spool 24, and the axially intermediate portion of the bar 26 is inserted therein, whereby the base end side portion of the belt 20 is locked by the bar 26 in the spool 24 and connected to the spool 24. The belt 20 is wound around the spool 24, and the belt 20 is drawn from the left side to the upper side of the spool 24.

A protector 28 made of resin and having a substantially U-shaped cross section is fitted into the upper portion of the frame 22, and the left wall, the front wall, and the rear wall of the protector 28 cover the back plate 22A, the leg plate 22B, and the leg plate 22C of the frame 22, respectively. The upper end portion of the protector 28 protrudes to the outside of the protector 28, and the upper end portion of the protector 28 is placed on the upper side of the frame 22. A substantially semicircular insertion hole 28A is formed to penetrate the lower portions of the front wall and the rear wall of the protector 28, and the insertion hole 28A is opened downward such that the upper portion of the spool 24 is inserted thereinto. The belt 20 is inserted into the protector 28, and the protector 28 prevents the contact of the belt 20 with the frame 22.

Figure 3A:
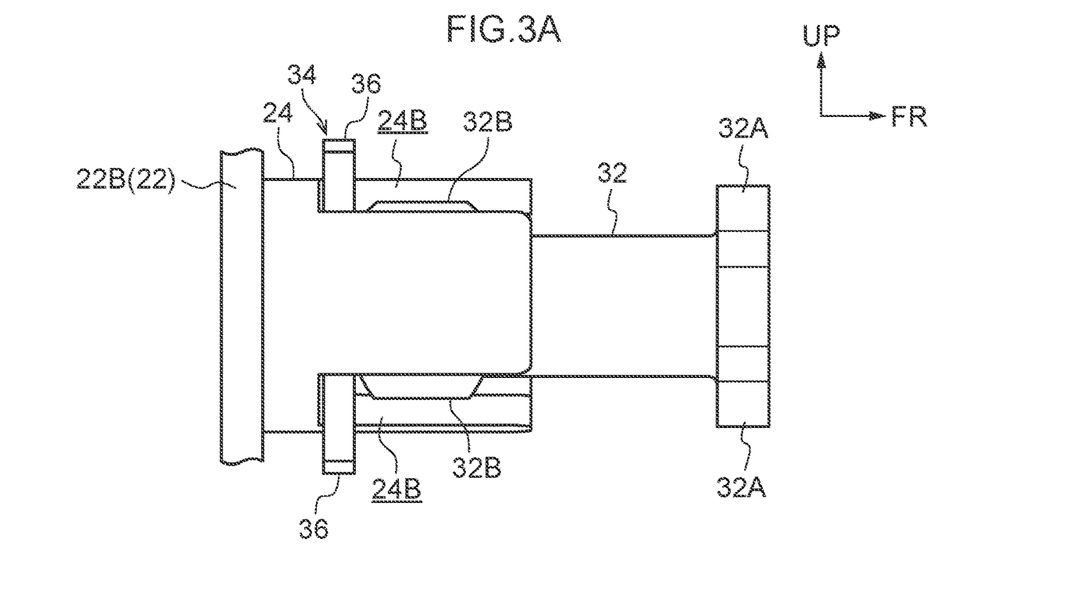
FIG. 3A is a side view illustrating a main portion of the buckle device according to the first embodiment of the invention as viewed from a right side.
Figure 3B:
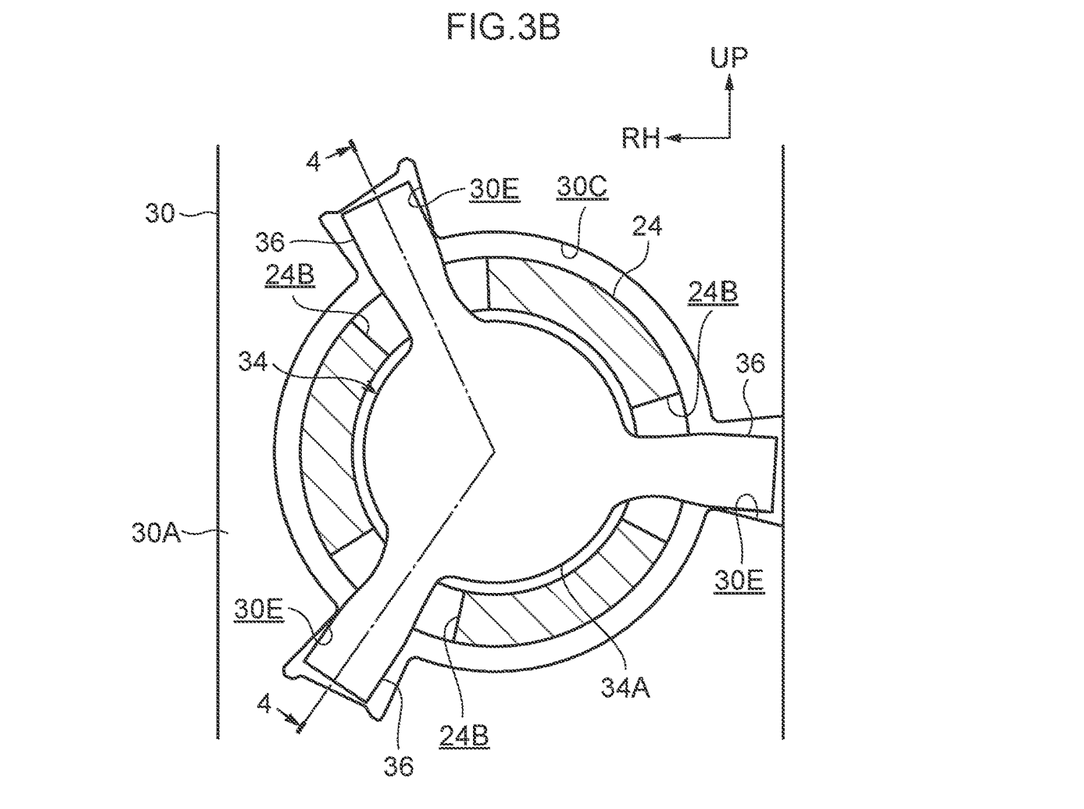
FIG. 3B is a cross-sectional view illustrating the main portion of the buckle device according to the first embodiment of the invention as viewed from a front side.
Figure 4:
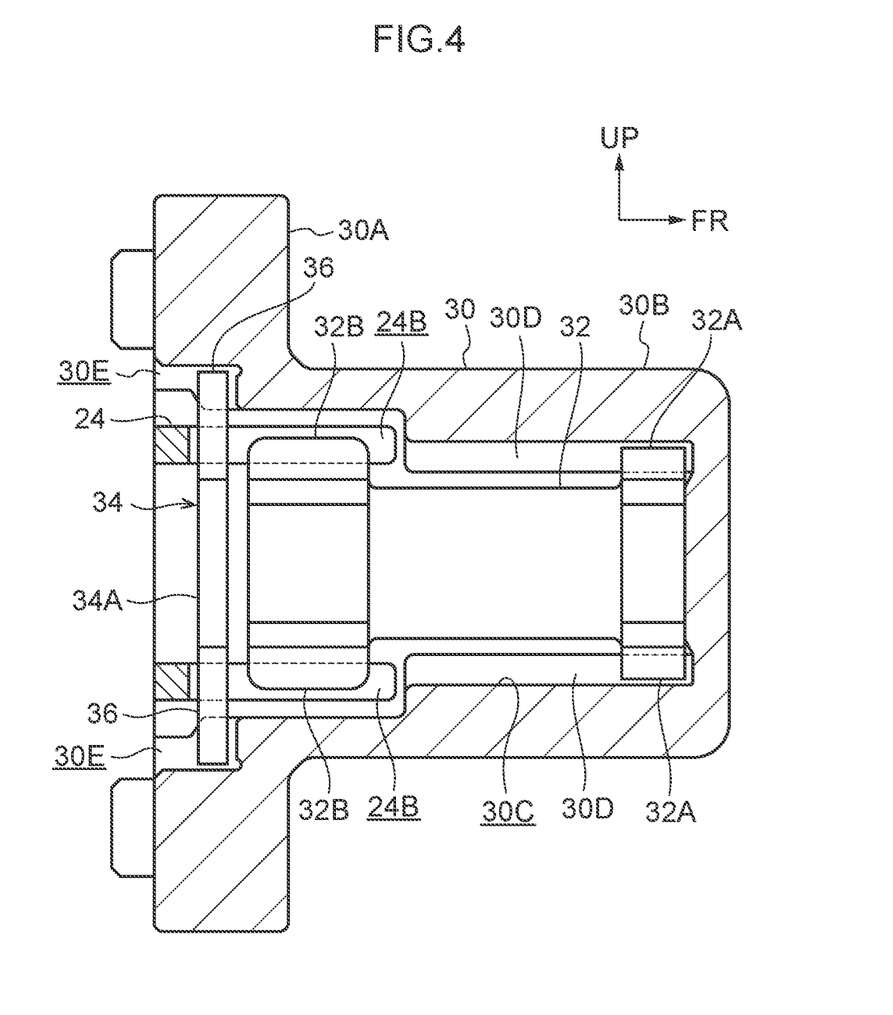
FIG. 4 is a cross-sectional view (a cross-sectional view taken along line 4-4 in FIG. 3B) illustrating the main portion of the buckle device according to the first embodiment of the invention as viewed from the right side.

A case 30 (see FIG. 4), which is made of metal, as a locking body is disposed on the front side of the frame 22 (leg plate 22B). The case 30 is provided with a substantially rectangular plate-shaped restriction plate 30A as a restriction portion, the restriction plate 30A is fixed to the leg plate 22B, and the case 30 is fixed to the leg plate 22B. A locking cylinder 30B having a substantially bottomed cylindrical shape is integrally formed on the front side of the restriction plate 30A, and the axial direction of the locking cylinder 30B is parallel to the front-rear direction. The inside of the locking cylinder 30B is formed into a substantially columnar inner hole 30C such that the inner hole penetrates the restriction plate 30A and is opened to the rear side of the restriction plate 30A, and the front portion of the spool 24 is coaxially inserted into the inner hole 30C. On the circumferential surface of the inner hole 30C, a plurality of (three in this embodiment) locking columns 30D having a substantially trapezoidal columnar shape as locking portions are integrally formed in a front portion, and the plurality of locking columns 30D are integrated with the front wall (bottom wall) of the locking cylinder 30B with the axial direction thereof being parallel to the front-rear direction (the axial direction of the inner hole 30C) and are disposed at equal intervals in the circumferential direction of the inner hole 30C. The rear surface of the locking column 30D is disposed in the vicinity of the front side of the spool 24, and the rear surface of the locking column 30D faces the front end surface of the spool 24 in the front-rear direction. A plurality of (three in this embodiment) substantially rectangular restriction recesses 30E (see FIG. 3B) are formed on the rear surface of the restriction plate 30A, and the plurality of restriction recesses 30E are disposed at equal intervals in the circumferential direction of the locking cylinder 30B and opened to the inner hole 30C.

A torsion shaft 32 (see FIGS. 3A and 4), which is made of metal and has a substantially columnar shape, as a prevention member (energy absorbing member) is coaxially disposed in the inner hole 30C. A plurality of (three in this embodiment) locking protrusions 32A, which each has a substantially trapezoidal columnar shape, as a locked portion is integrally formed at the front end portion of the torsion shaft 32, and the plurality of locking protrusions 32A is disposed at equal intervals in the circumferential direction of the torsion shaft 32 with the axial direction thereof being parallel to the front-rear direction (the axial direction of the torsion shaft 32). The locking protrusion 32A is inserted between the locking columns 30D of the case 30 (inner hole 30C) and fitted in the circumferential direction of the torsion shaft 32, and the torsion shaft 32 is locked to the case 30 (inner hole 30C) to be relatively non-rotatable. A plurality of (three in this embodiment) connection protrusions 32B, which each has a substantially trapezoidal columnar shape, as a connection portion is integrally formed at the rear end portion of the torsion shaft 32, and the plurality of connection protrusions 32B is disposed at equal intervals in the circumferential direction of the torsion shaft 32 with the axial direction thereof being parallel to the front-rear direction (the axial direction of the torsion shaft 32). The connection protrusion 32B is inserted into the connection hole 24B of the spool 24 and fitted in the circumferential direction of the torsion shaft 32, and the torsion shaft 32 is connected to the spool 24 to be relatively non-rotatable and prevents the rotation of the spool 24.

A shear plate 34 (see FIGS. 3A, 3B, and 4), which is made of metal, as a restriction member is disposed between the spool 24 and the torsion shaft 32. A disk-shaped base portion 34A is coaxially provided at the central portion of the shear plate 34, and the base portion 34A is coaxially inserted into the spool 24 on the rear side of the torsion shaft 32. A plurality of (three in this embodiment) fracture portions 36 each having a substantially elongated rectangular plate shape is integrally formed on the outer circumference of the base portion 34A, and the plurality of fracture portions 36 extends radially outward of the base portion 34A and is disposed at equal intervals in the circumferential direction of the base portion 34A. The fracture portion 36 passes through the connection hole 24B of the spool 24 and has a leading end portion inserted into the restriction recess 30E of the case 30 (restriction plate 30A), and the leading end of the fracture portion 36 abuts on the side surface of the restriction recess 30E and restricts the rotation of the shear plate 34.

A boot 38 (cover), which has a substantially rectangular cylindrical shape, as a covering member is provided in a range from the buckle body 18 to the frame 22, and the boot 38 is made of a soft resin and has flexibility. The upper portion of the boot 38 is gradually reduced toward the lower side in the right-left direction, and the lower portion of the buckle body 18 is fitted into the upper portion of the boot 38 to prevent the movement of the buckle body 18 to the lower side. The belt 20 is inserted into the intermediate portion of the boot 38 in the vertical direction, and the frame 22 (including the protector 28, the spool 24, and the bar 26) is fitted in the lower portion of the boot 38 which is opened to the front side. In the boot 38, a rectangular frame plate-shaped abutment frame 38A is integrally formed immediately above the lower portion, and the belt 20 is inserted into the abutment frame 38A. The upper end portion of the protector 28 abuts on the lower side of the abutment frame 38A, whereby the movement of the boot 38 to the lower side is prevented. As described above, in a state where the belt 20 is wound around the spool 24 so that a tension is applied to the belt 20, the boot 38 applies an elastic contraction force between the buckle body 18 and the frame 22, and the boot 38 urges the frame 22 downward and self-stands with respect to the frame 22 and urges the buckle body 18 upward to self-stand. A soft resin clip 40 passes through the left wall of the lower portion of the boot 38 and the back plate 22A of the frame 22, and the clip 40 sandwiches the left wall of the boot 38 and the back plate 22A to fix the boot 38 to the frame 22.

Next, the operation of this embodiment will be described.

In the seat belt device 12 having the above configuration, in the buckle device 10, the torsion shaft 32 prevents the rotation of the spool 24 and prevents the belt 20 from being drawn from the spool 24 and the buckle body 18 from extending upward, and the webbing 14 is attached to the occupant by engaging the tongue 16 of the webbing 14 with the buckle body 18.

In an emergency (at the time of collision or the like) of the vehicle, the locking mechanism of the winding device locks the drawing of the webbing 14 from the winding device, whereby the occupant is restrained by the webbing 14. Then, for example, when an inertial force is applied to the occupant, and the webbing 14 is pulled by the occupant, a drawing force from the spool 24 is applied to the belt 20 from the webbing 14 via the tongue 16 and the buckle body 18, whereby a rotational force is applied to the spool 24. Further, when the rotational force applied to the spool 24 causes the torsion shaft 32 to be twist-deformed between the front end portion and the rear end portion, the spool 24 is allowed to be rotated, and the belt 20 is allowed to be drawn from the spool 24, whereby the buckle body 18 (including the tongue 16) is allowed to extend upward. Therefore, the load applied from the webbing 14 to the occupant (particularly, the chest portion) is reduced (limited to a load for twist-deforming the torsion shaft 32), and the kinetic energy of the occupant is absorbed by the twist-deformation of the torsion shaft 32. In addition, the drawing allowance load of the belt 20 which is a load for allowing the belt 20 (the extension allowance load of the buckle body 18 which is a load for allowing the extension of the buckle body 18, the force limiter load) to be drawn is a load for twist-deforming the torsion shaft 32.

Here, when the side surface of the connection hole 24B of the spool 24 abuts on the fracture portion 36 of the shear plate 34, the fracture portion 36 can prevent the rotation of the spool 24 and prevent the drawing of the belt 20. When the belt 20 starts to be allowed to be drawn, the fracture portion 36 is deformed (including a partial fracture) by the side surface (particularly, a portion at the outer circumferential position of the spool 24) of the connection hole 24B, so that the fracture portion 36 allows the rotation of the spool 24 and allows the drawing of the belt 20. Then, when the fracture portion 36 is fractured by the side surface of the connection hole 24B, the fracture portion 36 permits the rotation of the spool 24 and permits the drawing of the belt 20.

Therefore, when the belt 20 starts to be allowed to be drawn, the drawing allowance load of the belt 20 can be increased by the load for deforming the fracture portion 36. As a result, for example, in a light collision of the vehicle, when the rotational force applied from the occupant to the spool 24 via the webbing 14, the tongue 16, the buckle body 18, and the belt 20 is small, the torsion shaft 32 can be suppressed from being twist-deformed. Therefore, the torsion shaft 32 can be suppressed from being unnecessarily twist-deformed, and the buckle body 18 can be suppressed from being unnecessarily extended.

The shear plate 34 is provided with the fracture portion 36. Therefore, the fracture portion 36 can be provided in the shear plate 34 independent of other members, and the fracture portion 36 can be easily installed.

Second Embodiment

Figure 5A:
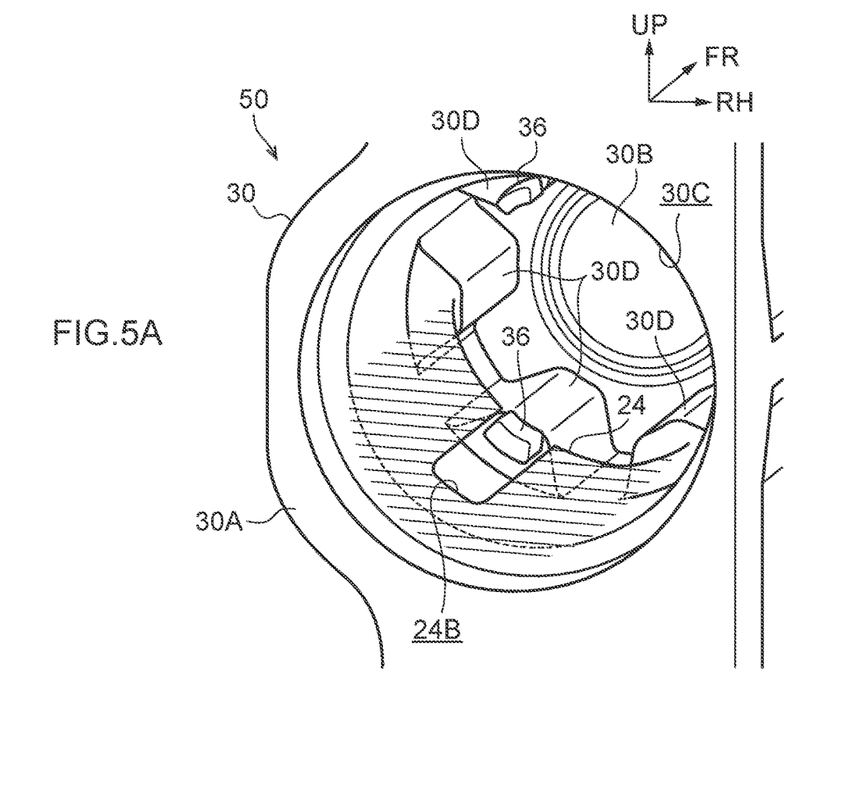
FIG. 5A is a perspective view illustrating a main portion of a buckle device according to a second embodiment of the invention as viewed from an obliquely rear right side.
Figure 5B:
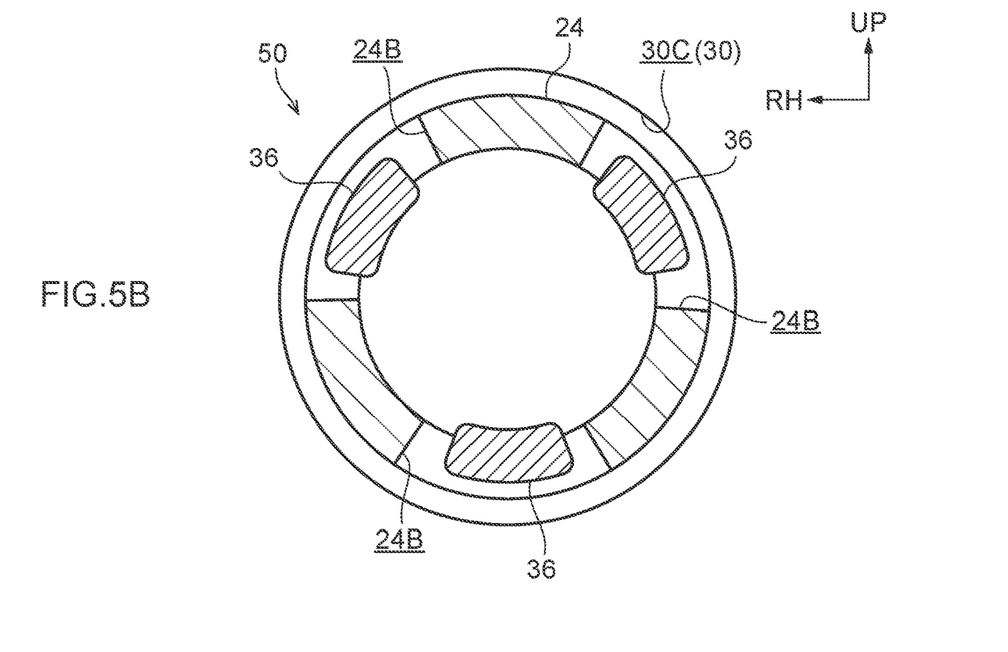
FIG. 5B is a cross-sectional view illustrating the main portion of the buckle device according to the second embodiment of the invention as viewed from the front side.

FIG. 5A illustrates a main portion of a buckle device 50 according to a second embodiment of the invention in a perspective view as viewed from an obliquely rear right side, and FIG. 5B illustrates the main portion of the buckle device 50 in a cross-sectional view as viewed from the front side.

The buckle device 50 according to this embodiment has a configuration substantially similar to that of the first embodiment, but differs in the following points.

In the buckle device 50 according to this embodiment, the case 30 (restriction plate 30A) is not provided with the restriction recess 30E, and the shear plate 34 is not provided.

As illustrated in FIG. 5A, six locking columns 30D are integrally formed on the circumferential surface of the inner hole 30C of the case 30, and six locking protrusions 32A are integrally formed on the front end portion of the torsion shaft 32.

As illustrated in FIGS. 5A and 5B, the fracture portions 36 having substantially rectangular columnar shapes are integrally formed on the front surfaces of three locking columns 30D, and the three fracture portions 36 are disposed at equal intervals in the circumferential direction of the locking cylinder 30B. The fracture portion 36 is elongated in the circumferential direction of the locking cylinder 30B and has an axial direction parallel to the front-rear direction (the axial direction of the locking cylinder 30B), and the fracture portion 36 is inserted into the connection hole 24B of the spool 24.

Here, when the side surface of the connection hole 24B of the spool 24 abuts on the fracture portion 36 of the case 30 (inner hole 30C), the fracture portion 36 can prevent the rotation of the spool 24 and prevent the drawing of the belt 20. When the allowance of the draw of the belt 20 is started, the fracture portion 36 is deformed (including a partial fracture) by the side surface (particularly, a portion at the front end surface position of the spool 24) of the connection hole 24B, so that the fracture portion 36 allows the rotation of the spool 24 and allows the drawing of the belt 20. Then, when the fracture portion 36 is fractured by the side surface of the connection hole 24B, the fracture portion 36 permits the rotation of the spool 24 and permits the drawing of the belt 20.

Therefore, also in this embodiment, it is possible to achieve operations and effects similar to those of the first embodiment except for the operations and effects obtained by providing the shear plate 34.

The fracture portion 36 is provided in the case 30. Therefore, the number of components can be reduced.

Third Embodiment

Figure 6A:
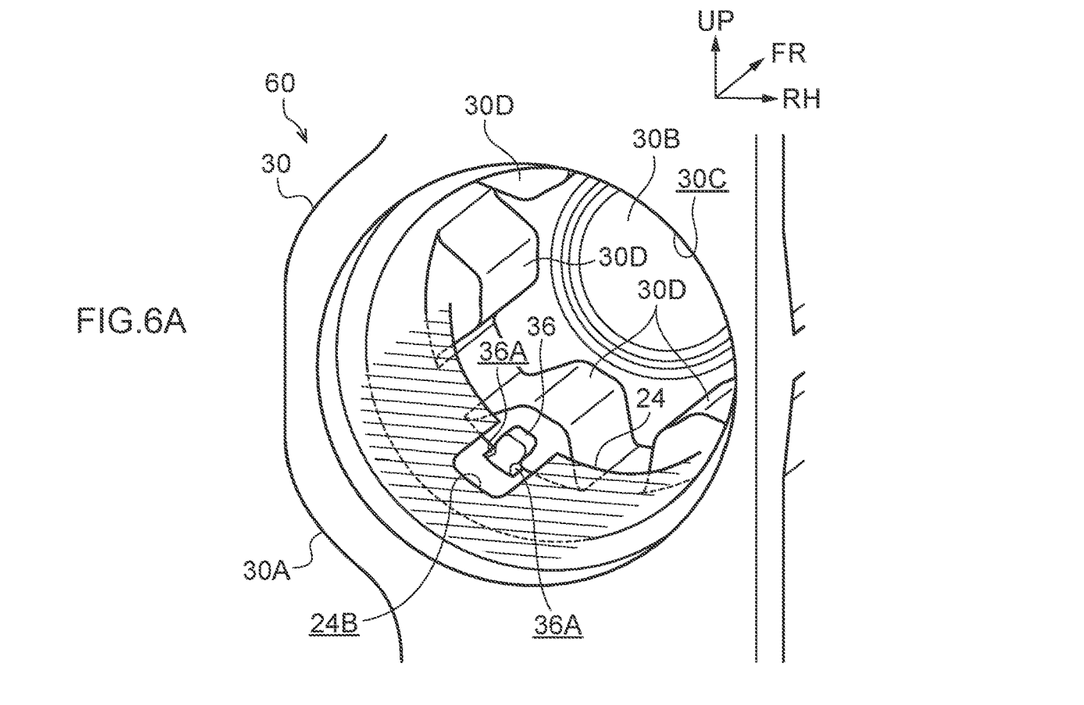
FIG. 6A is a perspective view illustrating a main portion of a buckle device according to a third embodiment of the invention as viewed from the obliquely rear right side.
Figure 6B:
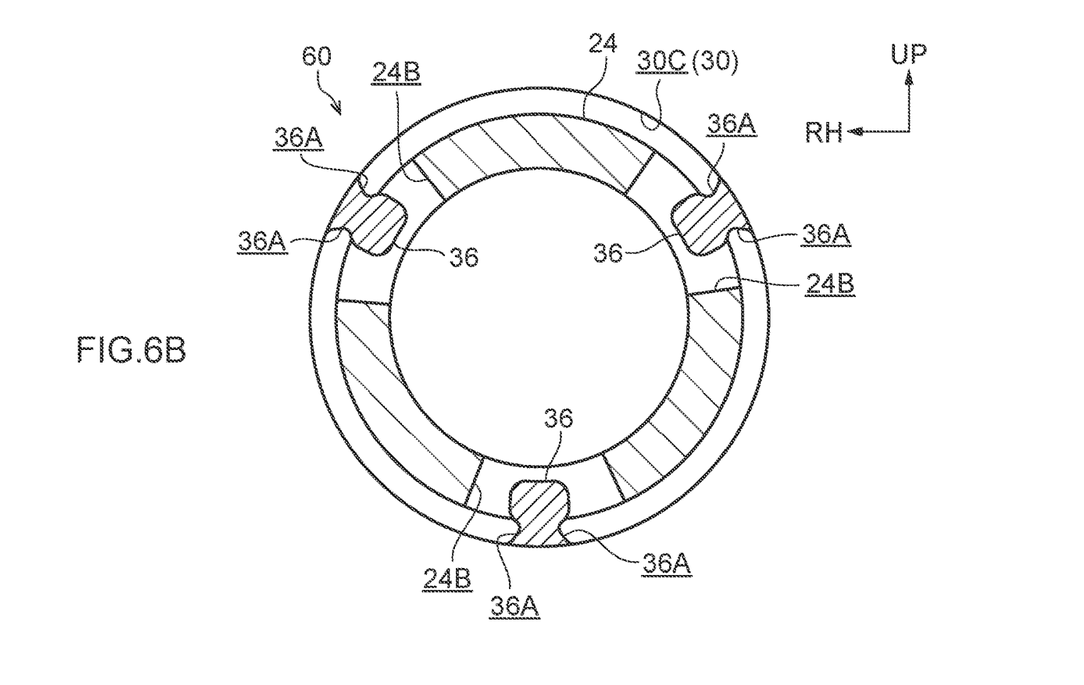
FIG. 6B is a cross-sectional view illustrating the main portion of the buckle device according to the third embodiment of the invention as viewed from the front side.

FIG. 6A illustrates a main portion of a buckle device 60 according to a third embodiment of the invention in a perspective view as viewed from the obliquely rear right side, and FIG. 6B illustrates the main portion of the buckle device 60 in a cross-sectional view as viewed from the front side.

The buckle device 60 according to this embodiment has a configuration substantially similar to that of the second embodiment, but differs in the following points.

As illustrated in FIGS. 6A and 6B, in the buckle device 60 according to this embodiment, the fracture portion 36 of the case 30 (inner hole 30C) is elongated in the radial direction of the locking cylinder 30B, and the fracture portion 36 is integrated with the circumferential surface of the inner hole 30C. On both side surfaces (surfaces on both sides in the circumferential direction of the inner hole 30C) of the fracture portion 36, recesses 36A having a substantially triangular cross section are formed, and the recess 36A is disposed on the entire fracture portion 36 in the front-rear direction. The recess 36A is disposed in a portion of the fracture portion 36 on the outer circumferential side of the locking cylinder 30B, and the recess 36A is disposed on the rotation locus of the outer circumference of the spool 24.

Here, when the side surface of the connection hole 24B of the spool 24 abuts on the fracture portion 36 of the case 30 (inner hole 30C), the fracture portion 36 can prevent the rotation of the spool 24 and prevent the drawing of the belt 20. When the belt 20 starts to be allowed to be drawn, the fracture portion 36 (particularly, the portion of forming the recess 36A) is deformed (including a partial fracture) by the side surface (particularly, a portion at the front end surface position of the spool 24 and a portion at the outer circumferential position of the spool 24) of the connection hole 24B, so that the fracture portion 36 allows the rotation of the spool 24 and allows the drawing of the belt 20. Then, when the fracture portion 36 is fractured by the side surface of the connection hole 24B, the fracture portion 36 permits the rotation of the spool 24 and permits the drawing of the belt 20.

Therefore, this embodiment can also achieve operations and effects similar to those of the second embodiment.

In the second embodiment and the third embodiment, three fracture portions 36 are provided. However, one, two, or four or more fracture portions 36 may be provided.

Fourth Embodiment

Figure 7A:
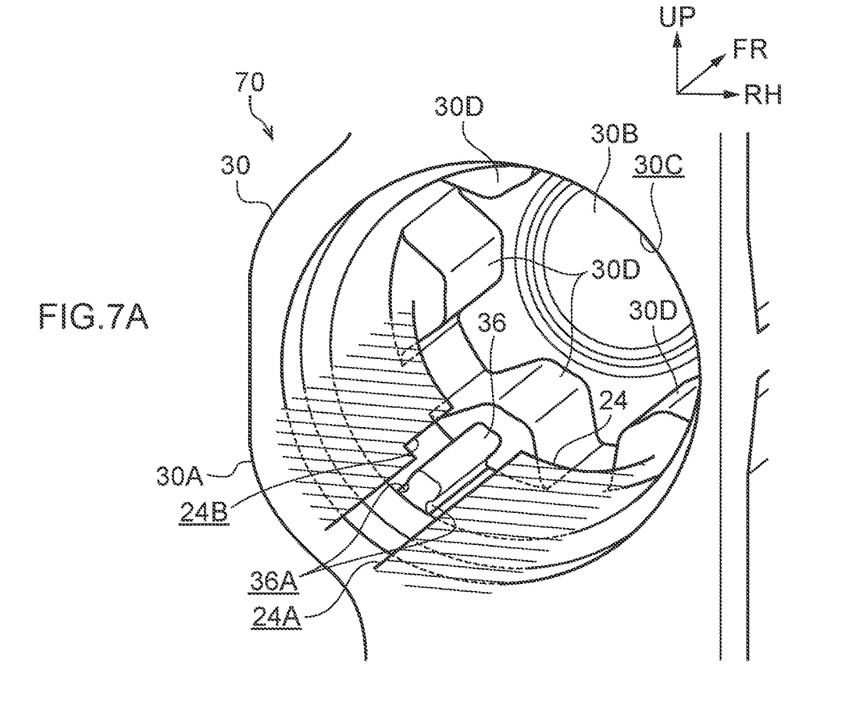
FIG. 7A is a perspective view illustrating a main portion of a buckle device according to a fourth embodiment of the invention as viewed from the obliquely rear right side.
Figure 7B:
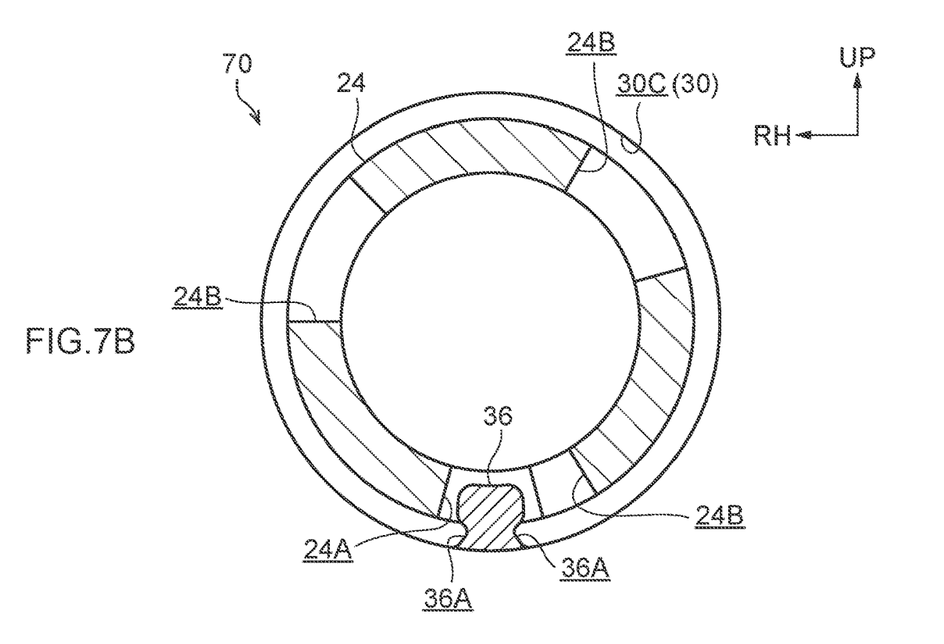
FIG. 7B is a cross-sectional view illustrating the main portion of the buckle device according to the fourth embodiment of the invention as viewed from the front side.

FIG. 7A illustrates a main portion of a buckle device 70 according to a fourth embodiment of the invention in a perspective view as viewed from the obliquely rear right side, and FIG. 7B illustrates the main portion of the buckle device 70 in a cross-sectional view as viewed from the front side.

The buckle device 70 according to this embodiment has a configuration substantially similar to that of the third embodiment, but differs in the following points.

As illustrated in FIGS. 7A and 7B, in the buckle device 70 according to this embodiment, one fracture portion 36 is provided in the case 30 (inner hole 30C), and the fracture portion 36 is extended in the axial direction of the locking cylinder 30B and inserted into the connection hole 24B and the insertion hole 24A of the spool 24.

Here, when the side surface of the insertion hole 24A of the spool 24 abuts on the fracture portion 36 of the case 30 (inner hole 30C), the fracture portion 36 can prevent the rotation of the spool 24 and prevent the drawing of the belt 20. When the belt 20 starts to be allowed to be drawn, the fracture portion 36 (particularly, the portion of forming the recess 36A) is deformed (including a partial fracture) by the side surfaces (particularly, the portion at the front end surface position of the spool 24 and the portion at the outer circumferential position of the spool 24) of the connection hole 24B and the insertion hole 24A, so that the fracture portion 36 allows the rotation of the spool 24 and allows the drawing of the belt 20. Then, when the fracture portion 36 is fractured by the side surfaces of the connection hole 24B and the insertion hole 24A, the fracture portion 36 permits the rotation of the spool 24 and permits the drawing of the belt 20.

Therefore, this embodiment can also achieve operations and effects similar to those of the third embodiment.

In the second to fourth embodiments, six locking columns 30D of the case 30 and six locking protrusions 32A of the torsion shaft 32 are provided. However, the number of the locking columns 30D of the case 30 and the number of the provided locking protrusions 32A of the torsion shaft 32 may be (for example, three) other than six.

Fifth Embodiment

Figure 8:
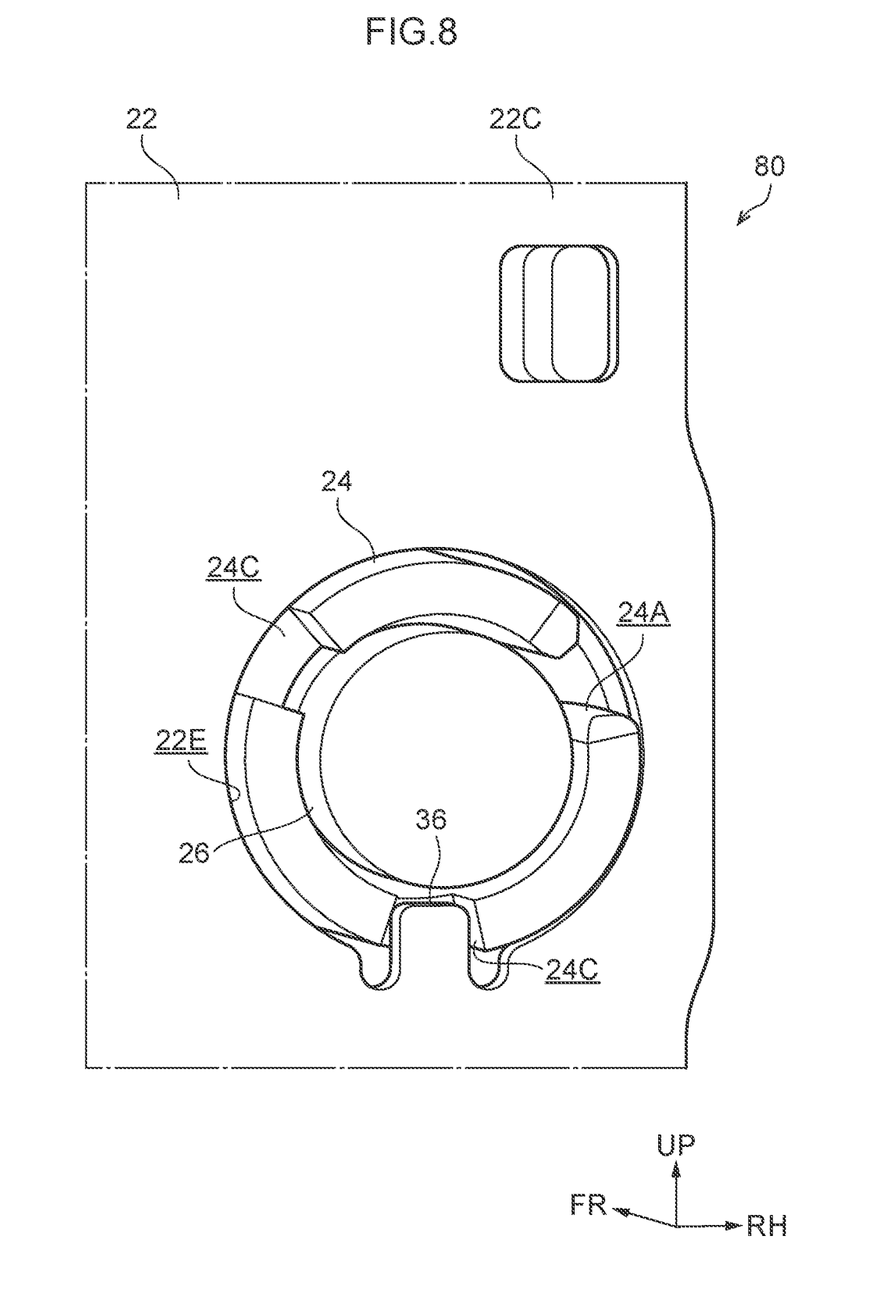
FIG. 8 is a perspective view illustrating a main portion of a buckle device according to a fifth embodiment of the invention as viewed from the an obliquely rear left side.

FIG. 8 illustrates a main portion of a buckle device 80 according to a fifth embodiment of the invention is a perspective view as viewed from an obliquely rear left side.

The buckle device 80 according to this embodiment has a configuration substantially similar to that of the first embodiment, but differs in the following points.

In the buckle device 80 according to this embodiment, the case 30 (restriction plate 30A) is not provided with the restriction recess 30E, and the shear plate 34 is not provided.

As illustrated in FIG. 8, the fracture portion 36 having a substantially rectangular plate shape is integrally formed on the inner circumferential surface (lower end surface) of the support hole 22E of the frame 22 (leg plate 22C), and the fracture portion 36 protrudes radially inward of the support hole 22E. In addition, the support hole 22E is enlarged radially outward on both sides of the fracture portion 36 in the circumferential direction of the support hole 22E.

A predetermined number (two in this embodiment) of rectangular fracture holes 24C are formed to penetrate the rear end portion of the spool 24, and the insertion hole 24A of the spool 24 and the predetermined number of fracture holes 24C are disposed at equal intervals in the circumferential direction of the spool 24. The fracture hole 24C is opened to the rear side, and the fracture portion 36 of the frame 22 is inserted into the fracture hole 24C.

Here, when the side surface of the fracture hole 24C of the spool 24 abuts on the fracture portion 36 of the frame 22 (leg plate 22C), the fracture portion 36 can prevent the rotation of the spool 24 and prevent the drawing of the belt 20. When the belt 20 starts to be allowed to be drawn, the fracture portion 36 is deformed (including a partial fracture) by the side surface (particularly, a portion at the outer circumferential position of the spool 24) of the fracture hole 24C, so that the fracture portion 36 allows the rotation of the spool 24 and allows the drawing of the belt 20. Then, when the fracture portion 36 is fractured by the side surface of the fracture hole 24C, the fracture portion 36 permits the rotation of the spool 24 and permits the drawing of the belt 20.

Therefore, also in this embodiment, it is possible to achieve operations and effects similar to those of the first embodiment except for the operations and effects obtained by providing the shear plate 34.

The fracture portion 36 is provided in the frame 22. Therefore, the number of components can be reduced.

In the fourth embodiment and the fifth embodiment, one fracture portion 36 is provided. However, a plurality of fracture portions 36 may be provided. In this case, in the fourth embodiment, for example, the fracture portion 36 of the third embodiment is inserted into the connection hole 24B that does not communicate with the insertion hole 24A of the spool 24. In addition, in the fifth embodiment, the fracture portion 36 may be inserted into the insertion hole 24A of the spool 24.

Sixth Embodiment

Figure 9A:
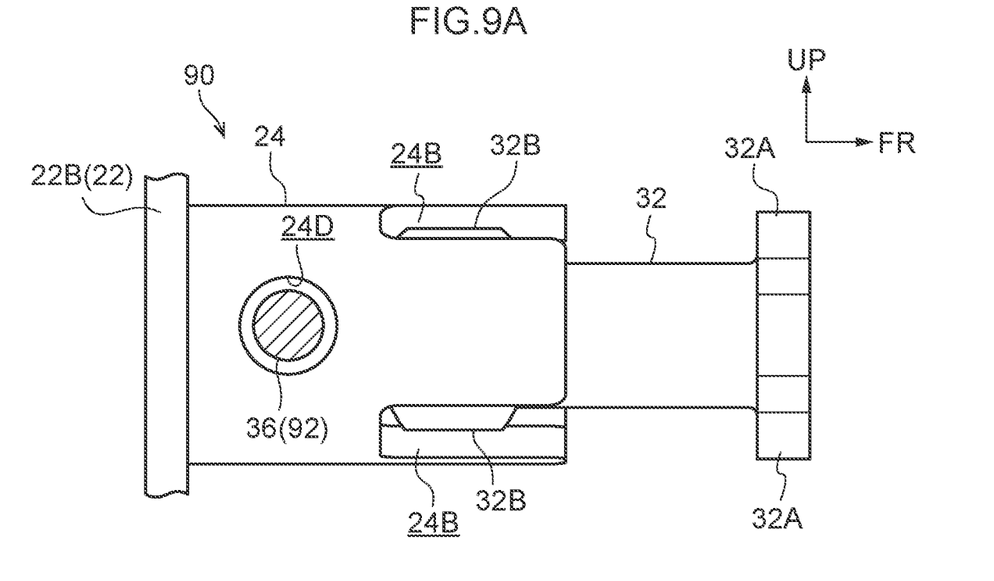
FIG. 9A is a side view illustrating a main portion of a buckle device according to a sixth embodiment of the invention as viewed from the right side.
Figure 9B:
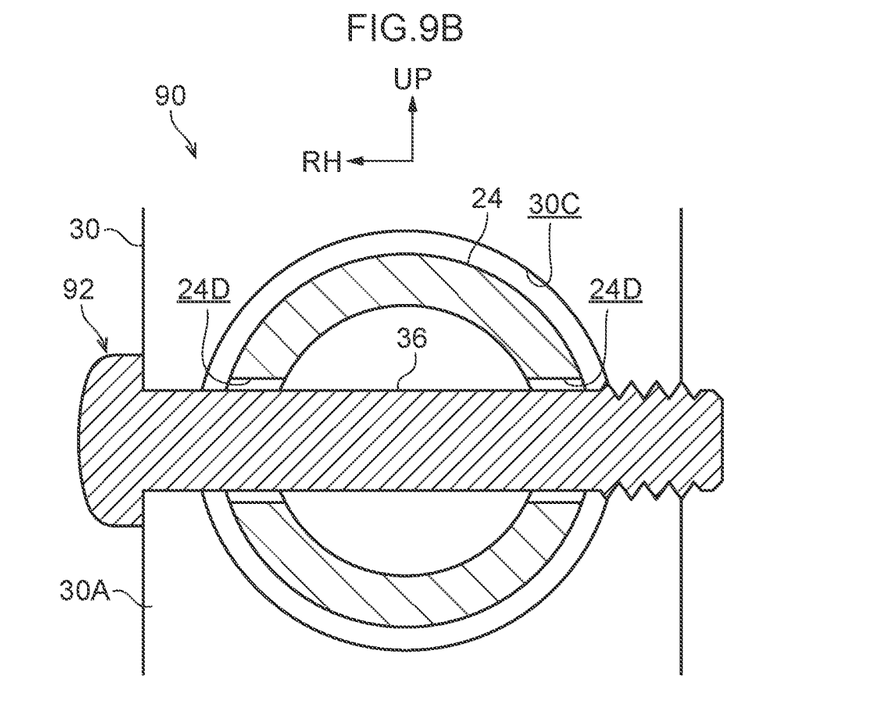
FIG. 9B is a cross-sectional view illustrating the main portion of the buckle device according to the sixth embodiment of the invention as viewed from the front side.

FIG. 9A illustrates a main portion of a buckle device 90 according to a sixth embodiment of the invention in a side view as viewed from the right side, and FIG. 9B illustrates the main portion of the buckle device 90 in a cross-sectional view as viewed from the front side.

The buckle device 90 according to this embodiment has a configuration substantially similar to that of the first embodiment, but differs in the following points.

In the buckle device 90 according to this embodiment, the case 30 (restriction plate 30A) is not provided with the restriction recess 30E, and the shear plate 34 is not provided.

As illustrated in FIGS. 9A and 9B, a pair of circular fracture holes 24D is formed to penetrate the left end portion and the right end portion in the vicinity of the rear side of the connection hole 24B of the spool 24, and the pair of fracture holes 24D is opposed to each other in the front-rear direction.

A shear screw 92, which is made of metal and has a substantially columnar shape, as a restriction member is disposed in the restriction plate 30A of the case 30, and the axial direction of the shear screw 92 is parallel to the right-left direction. The left end portion of the shear screw 92 is formed in a screw shape, and the right end portion of the shear screw 92 is enlarged in diameter. The shear screw 92 passes through the restriction plate 30A, and the central axis of the shear screw 92 is disposed along the radial direction of the inner hole 30C of the case 30. The left end portion of the shear screw 92 is screwed into the left side portion of the restriction plate 30A with respect to the inner hole 30C, and the right end portion of the shear screw 92 abuts on the right side surface of the restriction plate 30A, whereby the rotation of the shear screw 92 in the circumferential direction of the inner hole 30C is restricted by the restriction plate 30A. A portion between the left end portion and the right end portion of the shear screw 92 is formed as the columnar fracture portion 36, and the fracture portion 36 passes through the pair of fracture holes 24D of the spool 24.

Here, when the circumferential surface of the fracture hole 24D of the spool 24 abuts on the fracture portion 36 of the shear screw 92, the fracture portion 36 can prevent the rotation of the spool 24 and prevent the drawing of the belt 20. When the belt 20 starts to be allowed to be drawn, the fracture portion 36 is deformed (including a partial fracture) by the circumferential surface (particularly, a portion at the outer circumferential position of the spool 24) of the fracture hole 24D, so that the fracture portion 36 allows the rotation of the spool 24 and allows the drawing of the belt 20. Then, when the belt 20 is allowed to be drawn, and the fracture portion 36 is fractured by the circumferential surface of the fractured hole 24D, the fracture portion 36 permits the rotation of the spool 24 and permits the drawing of the belt 20.

Therefore, this embodiment can also achieve operations and effects similar to those of the first embodiment.

In particular, the fracture portion 36 is provided in the shear screw 92. Therefore, the fracture portion 36 can be provided in the shear screw 92 independent of other members, and the fracture portion 36 can be easily installed.

In the first to sixth embodiments, the fracture portion 36 may be deformed before the torsion shaft 32 is twist-deformed.

What is claimed is:

1. A buckle device, comprising:
a buckle body configured to engage with a tongue provided at a webbing for attachment to an occupant;
a connection member which has a leading end side connected to the buckle body;
a winding shaft around which the connection member is wound from a base end side;
a prevention member which is configured to prevent the connection member from being drawn from the winding shaft, and which is deformed to allow the connection member to be drawn from the winding shaft and allow the buckle body to extend; and
a fracture portion which is configured to prevent the connection member from being drawn from the winding shaft, which is deformed to allow the connection member to be drawn from the winding shaft when the connection member starts to be allowed to be drawn from the winding shaft, and which is fractured to permit the connection member to be drawn from the winding shaft.

2. The buckle device according to claim 1, further comprising a restriction member at which rotation is restricted, and which is provided with the fracture portion.

3. The buckle device according to claim 1, further comprising a locking body at which the prevention member is locked, and which is provided with the fracture portion.

4. The buckle device according to claim 1, further comprising a support which supports the winding shaft, and which is provided with the fracture portion.

5. The buckle device according to claim 1, wherein the fracture portion protrudes in at least one of a rotational radial direction of the winding shaft or a rotational axis direction of the winding shaft.

6. The buckle device according to claim 1, wherein a recess is provided at the fracture portion.

7. The buckle device according to claim 1, wherein the fracture portion is deformed by the winding shaft.

8. The buckle device according to claim 1, wherein a plurality of the fracture portions is disposed in a rotational direction of the winding shaft.

9. The buckle device according to claim 1, wherein the fracture portion is deformed after the prevention member is deformed.

10. The buckle device according to claim 1, wherein the fracture portion is deformed before the prevention member is deformed.

* * * * *